United States Patent
Dong et al.

(10) Patent No.: US 12,013,826 B2
(45) Date of Patent: Jun. 18, 2024

(54) SYSTEMS AND METHODS FOR DATABASE QUERY EFFICIENCY IMPROVEMENT

(71) Applicant: Coupang Corp., Seoul (KR)

(72) Inventors: Bin Dong, Beijing (CN); Zhan Chen, Seattle, WA (US); Zhiyong Huang, Beijing (CN); Chuanchuan Han, Beijing (CN); Junzhao Zhang, Beijing (CN)

(73) Assignee: Coupang Corp., Seoul (KR)

( * ) Notice: Subject to any disclaimer, the term of this patent is extended or adjusted under 35 U.S.C. 154(b) by 474 days.

(21) Appl. No.: 17/181,272

(22) Filed: Feb. 22, 2021

(65) Prior Publication Data
US 2022/0156237 A1 May 19, 2022

Related U.S. Application Data

(63) Continuation of application No. 16/950,342, filed on Nov. 17, 2020, now Pat. No. 10,963,438.

(51) Int. Cl.
*G06F 16/21* (2019.01)
*G06F 16/22* (2019.01)
(Continued)

(52) U.S. Cl.
CPC .......... *G06F 16/217* (2019.01); *G06F 16/211* (2019.01); *G06F 16/214* (2019.01);
(Continued)

(58) Field of Classification Search
CPC ............... G06F 16/217; G06F 16/221; G06F 16/24557; G06F 16/287; G06F 16/211; G06F 16/214
See application file for complete search history.

(56) References Cited

U.S. PATENT DOCUMENTS

| 4,506,326 A | 3/1985 | Shaw |
| 6,529,896 B1 * | 3/2003 | Leung ............... G06F 16/24542 |

(Continued)

FOREIGN PATENT DOCUMENTS

| CN | 103177046 A | 6/2013 |
| CN | 104090901 A | 10/2014 |

(Continued)

OTHER PUBLICATIONS

Raunak et al., Resource Management for Complex, Dynamic Environments; IEEE 2013.*

(Continued)

*Primary Examiner* — Daniel A Kuddus
(74) *Attorney, Agent, or Firm* — FINNEGAN, HENDERSON, FARABOW, GARRETT & DUNNER LLP

(57) ABSTRACT

Methods and systems for database query efficiency improvement are disclosed. In one embodiment, a method includes mirroring a primary database to a secondary database; creating a testing database comprising the schema; receiving a query; running the query on the testing database; and evaluating the query by: identifying predicates in the query; determining most common values for each column name by querying the secondary database; creating, for each column name, a list comprising at least one of the most common values; creating a test predicate comprising one of the column names and an entry for the list corresponding to the column name; creating a test query comprising one or more test predicates; determining a resource utilization of the query by running each of the test queries on the secondary database; and providing, to a user interface for display, an efficiency improvement recommendation when the resource utilization exceeds a threshold.

18 Claims, 3 Drawing Sheets

(51) Int. Cl.
*G06F 16/2455* (2019.01)
*G06F 16/28* (2019.01)

(52) U.S. Cl.
CPC ...... *G06F 16/221* (2019.01); *G06F 16/24557* (2019.01); *G06F 16/287* (2019.01)

(56) References Cited

U.S. PATENT DOCUMENTS

| | | | |
|---|---|---|---|
| 6,564,212 B2 * | 5/2003 | Koskas | G06F 16/24534 707/765 |
| 6,633,883 B2 * | 10/2003 | Koskas | G06F 16/284 707/999.102 |
| 6,826,562 B1 * | 11/2004 | Leung | G06F 16/24535 707/999.002 |
| 7,213,012 B2 | 5/2007 | Jakobsson | |
| 7,376,638 B2 | 5/2008 | Gordon | |
| 7,707,219 B1 | 4/2010 | Bruso | |
| 8,037,108 B1 * | 10/2011 | Chang | G06F 16/214 707/803 |
| 8,458,191 B2 * | 6/2013 | Bhattacharjee | G06F 16/284 707/801 |
| 2002/0078041 A1 * | 6/2002 | Wu | G06F 16/86 |
| 2002/0095397 A1 * | 7/2002 | Koskas | G06F 16/2237 |
| 2002/0095421 A1 * | 7/2002 | Koskas | G06F 16/284 |
| 2005/0165741 A1 * | 7/2005 | Gordon | G06F 16/217 |
| 2007/0198615 A1 | 8/2007 | Krishnamurthy | |
| 2010/0049730 A1 * | 2/2010 | Qiao | G06Q 40/00 707/756 |
| 2011/0225167 A1 * | 9/2011 | Bhattacharjee | G06F 16/284 711/E12.001 |
| 2014/0230070 A1 | 8/2014 | Ramamurthy | |
| 2014/0280065 A1 | 9/2014 | Cronin et al. | |
| 2014/0282697 A1 | 9/2014 | Sinha | |
| 2015/0165741 A1 * | 6/2015 | Imai | H01L 21/67092 156/60 |
| 2017/0102678 A1 | 4/2017 | Nixon | |
| 2017/0308574 A1 * | 10/2017 | Kim | G06F 16/24542 |
| 2018/0157978 A1 * | 6/2018 | Buda | G06N 20/00 |
| 2019/0236194 A1 * | 8/2019 | James | G06F 16/24542 |
| 2020/0026762 A1 | 1/2020 | Kim | |
| 2021/0365451 A1 * | 11/2021 | Li | G06F 16/24535 |

FOREIGN PATENT DOCUMENTS

| | | |
|---|---|---|
| CN | 105787387 A | 7/2016 |
| JP | 2017509066 A | 3/2017 |
| JP | 2020502626 A | 1/2020 |
| JP | 2020514935 A | 5/2020 |
| KR | 101389290 B1 | 4/2014 |
| KR | 101628097 B1 | 6/2016 |
| KR | 10-2018-0025102 A | 3/2018 |
| TW | 202025770 A | 7/2020 |
| WO | WO 2008/077053 A2 | 6/2008 |
| WO | WO2008077053 A2 * | 6/2008 |

OTHER PUBLICATIONS

GitHub Repository for Skew Programming Library, https://github.com/XiaoMi/soar, Jan. 21, 2019 (2 pages).
Notice of Allowance and Search Report in counterpart Taiwanese Application No. 110116021 dated May 5, 2022 (3 pages).
Notice of Allowance in counterpart Korean Application No. 10-2021-7019165 dated Nov. 3, 2021 (4 pages).
Examination Notice in counterpart Hong Kong Patent Application No. 22021032432.7 dated Jun. 7, 2022 (3 pages).
International Search Report and Written Opinion of the International Searching Authority for International Application No. PCT/IB2020/061282, dated Aug. 13, 2021 (7 pages).

* cited by examiner

SYSTEMS AND METHODS FOR DATABASE QUERY EFFICIENCY IMPROVEMENT

CROSS-REFERENCE TO RELATED APPLICATIONS

This application is a continuation of, and claims priority under 35 U.S.C. § 119 to U.S. patent application Ser. No. 16/950,342, filed on Nov. 17, 2020. The disclosures of the above-referenced application are expressly incorporated herein by reference.

TECHNICAL FIELD

The present disclosure generally relates to computerized systems and methods for database query efficiency improvement. In particular, embodiments of the present disclosure relate to a system that analyzes a database query. The system tests the query for proper functioning on a test database. If the query is successful, the system creates variations of the query and runs the variations on an offline database to test query efficiency. The system exercises multiple query scenarios on the offline database prior to the queries running on a production database. In this way, latent query inefficiencies and risk of excessive resource usage are identified before they degrade user experiences.

BACKGROUND

Advancements in large database storage speed and accessibility have enabled developers to enhance user website experiences. For example, when a user views products on an ecommerce website, scripts underlying the website may run multiple automated database queries to obtain product information which is then incorporated into the website. In some cases, developers may program a website with query structures that are then completed with user search terms before being run on a server database. Developers may also create programs that perform automated database queries and analysis, such as for live streamed stock metrics, traffic planning, transit updates, sports scores, and the like.

For small user bases with simple queries, modern database architecture can handle even inefficient queries quickly with limited detriment to user experience. However, when database queries become complex, or when an application has a large user base, even small database inefficiencies multiply into significant detriments to user experiences. This may lead to slow websites and apps, causing lost customers or transactions.

However, developers are often limited in their ability to identify and correct inefficient queries. Typically, database lags due to inefficient queries are not identified until after users experience—and, in many cases, report—issues. When providing services or products in a competitive environment to a large user base, these issues may never be reported. If a user merely reports a slow website, identifying an inefficient database query may be time consuming and resource intensive. And, even if a developer determines that an inefficient query is the cause of a slow website, correcting the query to provide the same functionality efficiently may also be time consuming.

Accordingly, there is a need for systems and methods to automatically detect and correct inefficient queries in a test environment prior to deployment, thus limiting adverse effects to user experiences.

SUMMARY

One aspect of the present disclosure is directed to a computer-implemented system for database query efficiency improvement. The system comprises a memory storing instructions and at least one processor configured to execute the instructions to perform operations. The operations comprise mirroring a primary database to a secondary database, the second database comprising a schema; creating a testing database comprising the schema; receiving a query; running the query on the testing database; and evaluating the query, in response to the query successfully completing on the testing database, by: identifying predicates in the query, each predicate comprising a column name; determining most common values for each column name by querying the secondary database; creating, for each column name, a list comprising at least one of the most common values; creating a test predicate comprising one of the column names and an entry for the list corresponding to the column name; creating a test query comprising one or more test predicates; determining a resource utilization of the query by running each of the test queries on the secondary database; and providing, to a user interface for display, an efficiency improvement recommendation when the resource utilization exceeds a threshold. diagnosis of live virtual server performance data.

Another aspect of the present disclosure is directed to a computer-implemented method for database query efficiency improvement. The method includes steps of mirroring a primary database to a secondary database, the second database comprising a schema; creating a testing database comprising the schema; receiving a query; running the query on the testing database; and evaluating the query, in response to the query successfully completing on the testing database, by: identifying predicates in the query, each predicate comprising a column name; determining most common values for each column name by querying the secondary database; creating, for each column name, a list comprising at least one of the most common values; creating a test predicate comprising one of the column names and an entry for the list corresponding to the column name; creating a test query comprising one or more test predicates; determining a resource utilization of the query by running each of the test queries on the secondary database; and providing, to a user interface for display, an efficiency improvement recommendation when the resource utilization exceeds a threshold. diagnosis of live virtual server performance data.

Another aspect of the present disclosure is directed to a computer-implemented method for database query efficiency improvement. The method includes the steps of mirroring a primary database to a secondary database, the second database comprising a schema; creating a testing database comprising the schema; receiving a query; running the query on the testing database; and evaluating the query, if the query successfully completes on the testing database, by: identifying predicates in the query, each predicate comprising a unique column name; determining most common values for each column name by querying the secondary database; determining most common queried values for each column name by querying a query store; creating, for each column name, a list comprising at least one of the most common values and at least one of the most common queried values; creating test predicates comprising one of the column names and an entry for the list corresponding to the column name; creating test queries comprising combinations of test predicates; determining query processing times by running each of the test queries on the secondary database; and running the query on the primary database when a maximum of the query processing times is less than a threshold.

Other systems, methods, and computer-readable media are also discussed herein.

DETAILED DESCRIPTION

Figure 1:
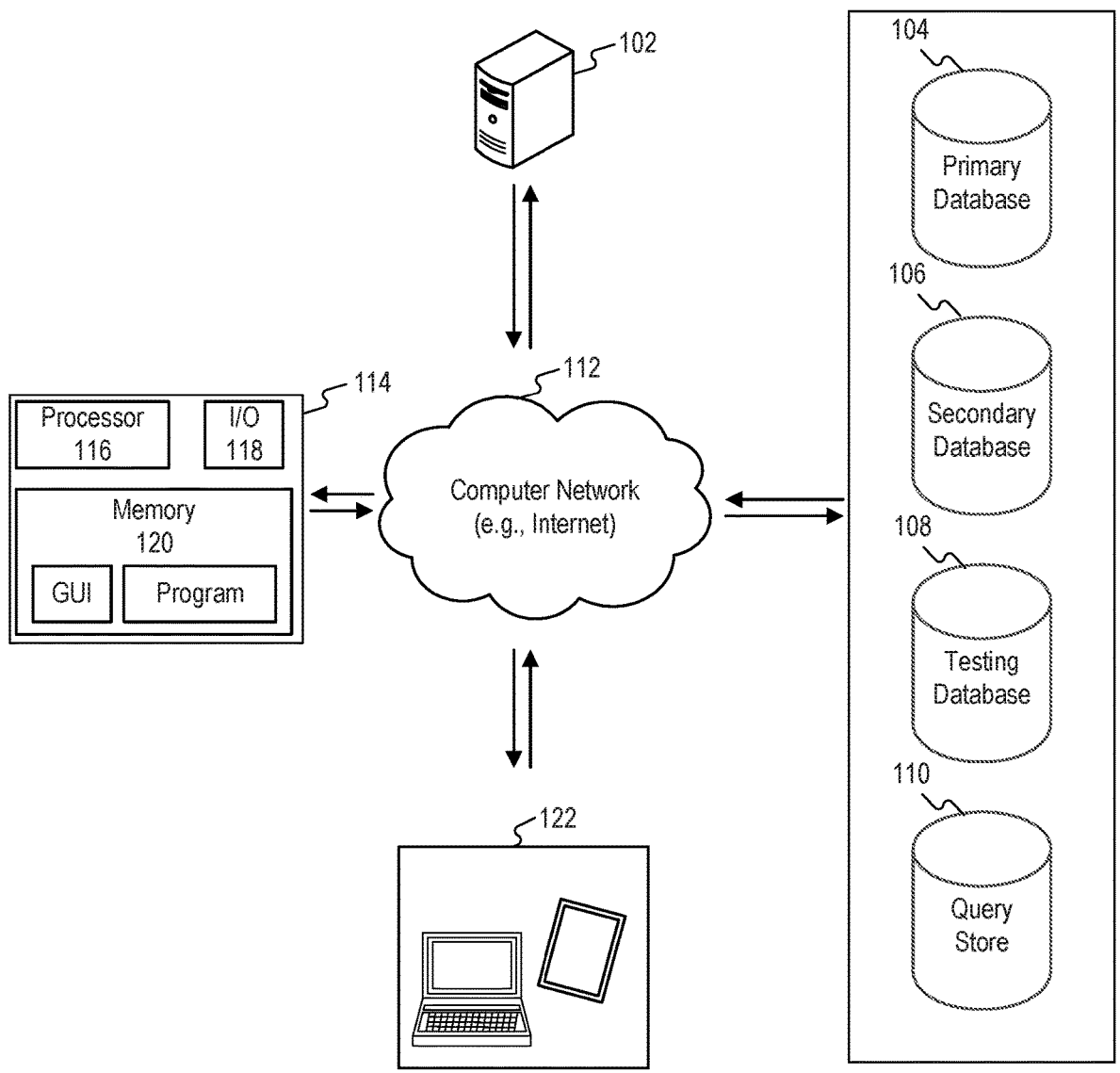
FIG. 1 illustrates a network including a client and databases, consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

Embodiments of the present disclosure are directed to systems and methods for virtual server resource usage metric grading.

FIG. 1 shows a system 100 including a client and databases, consistent with the disclosed embodiments. Components of system 100 may communicate by computer network 112. Computer network 112 may include any combination of one or more of the Internet, an Intranet, a Local-Area Network (LAN), a Wide-Area Network (WAN), a Metropolitan-Area Network (MAN), a virtual private network (VPN), a wireless network (e.g., compliant with the IEEE 802.11a/b/g/n), a wired network, a leased line, a cellular data network, or a network using Bluetooth connections, infrared connections, or Near-Field Communication (NFC) connections.

System 100 may include a plurality of databases such as primary database 104, secondary database 106, testing database 108, and query store 110. Databases 104-110 may include, for example, NoSQL databases such as HBase, MongoDB™ or Cassandra™. Alternatively, databases 104-110 may include relational databases such as Oracle, MySQL, and Microsoft SQL Server. In some embodiments, databases 104-110 may take the form of servers, virtual servers, general purpose computers, mainframe computers, or any combination of these components. Any number of primary databases 104, secondary databases 106, testing databases 108, or query stores 110 may be included in system 100.

Primary database 104 may provide data to server 102 in response to website requests made by client device 122. Primary database 104 may also be referred to as a production database. In other words, clients may interact with data stored on primary database 104. Data stored on primary database may include real-world data used to satisfy client needs, and may be protected by various security features. For instance, the data may include bank account information or personally identifiable information that requires a secure connection and permissions for access. Server 102 may administer the access permissions.

Secondary database 106 may contain data copied from primary database 104. The data may be sanitized so that information stored on secondary database is not protected by restrictive permission requirements. Secondary database 106 may copy data from primary database 104 ad hoc, for instance, when primary database 104 is not busy responding to user requests. Secondary database 106 may also copy information periodically, such as every few hours, every night, every other night, every week, etc., or on demand. In some embodiments, users do not interact with data stored on secondary database 106. Instead, data on secondary database 106 may be used to test queries without tasking primary database 104 and potentially interrupting user requests. Secondary database 106 may be referred to as an offline database.

Testing database 108 may contain a subset of data stored in primary database 104. The data may be sanitized to remove real-world data while maintaining the same data structure as the primary database. For example, if primary database 104 stores a table of bank account information corresponding to account owner names, testing database 108 may store a table of random numbers corresponding to fictional names. A developer may use the data stored on testing database 108 to determine if a query functions. In other words, testing database 108 has the same data structure as primary database 104 or secondary database 106, but may have different and/or less data than primary database 104 and secondary database 106.

Query store 110 may store records of queries run by users. Server 102 may populate query store 110 as requests are received from users. As an example for ecommerce, users may submit requests for an online store inventory of shoes and coats. When a request is made, server 102 may generate a query to obtain inventory entries where the item type is "shoe". Server 102 may also update a log stored in query store 110 showing that a user triggered a query for "shoe" in a column labeled "inventory". Data from query stores 110 may be used for query efficiency testing.

System 100 may also include server 102. Server 102 may store information, such as HTML code, graphics, scripts, and connection protocols in order to provide a website, an app, and the like to client device 122. Sever 102 may retrieve and process information provided by one of databases 104-110 to populate a website. In some embodiments, server 102 may provide raw data from one of databases 104-110 to client device 122 without processing. Additionally, server 102 may process data from client device 122 to construct a query, submit the query to a database, analyze or format results, and provide the results to client device 122. Server 102 may also upload data to or download data from any of databases 104-110. In some embodiments, server 102 may also manage databases 104-110 by copying data, modifying data, allocating storage, arranging redundant data storage, and controlling data access in the one or more databases 104-110.

Client device 122 may be a laptop, standalone computer, mobile phone, tablet computer, wearable device (e.g. smart watch) and the like. Client device 122 may be associated with a website customer using the services or products offered by the website. Alternatively or additionally, client device 122 may be associated with a developer. For example, a developer may write code underlying a website and upload the code to server 102 via client device 122.

System 100 may further include query test system 114. Query test system 114 may coordinate testing of queries prior to queries being incorporated into code running on server 102. Thus, a developer may utilize query test system 114 via client device 122 to test for query error and efficiency. Query test system 114 may include at least one processor 116, an input/output (I/O) device 118 that allows data to be transmitted, and at least one memory 120. Memory 120 may store a program for operating query tests. Memory 120 may also store instructions for a graphical user interface (GUI). Query test system 114 may also have a user input device and display device (not shown). Server 102, client device 122 and databases 104-110 may also include processors, I/O devices, memories, programs, and user interfaces. In some embodiments, client device 122 provides user input and display functionality to allow a developer to interact query test system 114.

Furthermore, processor 116 may be a generic or specific electronic device capable of manipulating or processing information. For example, the processor may include one or more of a central processing unit (or "CPU"), a graphics processing unit (or "GPU"), an optical processor, a programmable logic controllers, a microcontroller, a microprocessor, a digital signal processor, an intellectual property (IP) core, a Programmable Logic Array (PLA), a Programmable Array Logic (PAL), a Generic Array Logic (GAL), a Complex Programmable Logic Device (CPLD), a Field-Programmable Gate Array (FPGA), a System On Chip (SoC), an Application-Specific Integrated Circuit (ASIC), or any type of circuit capable of data processing. The processor may also be a virtual processor that may include one or more processors distributed across multiple machines or devices coupled via a network.

Memory 120 may be a generic or specific electronic device capable of storing codes and data accessible by processor 116 (e.g., via a bus, not shown). For example, memory 120 may include one or more of a random-access memory (RAM), a read-only memory (ROM), an optical disc, a magnetic disk, a hard drive, a solid-state drive, a flash drive, a security digital (SD) card, a memory stick, a compact flash (CF) card, or any type of storage device. The codes may include an operating system (OS) and/or one or more application programs (or "apps") for specific tasks. Memory 120 may also be a virtual memory that may include one or more memories distributed across multiple machines or devices coupled via a network.

In some embodiments, any combination of query test system 114, server 102, and/or databases 104-110 may be combined into a single device. For instance, server 102 may execute functions of query test system 114 and contain data of query store 110, or query test system 114 may manage any of databases 104-110. Individual devices may also be replicated or divided. For example, primary database 104 may have a plurality of backup databases to ensure continuous operation in the event of a failure, or the program on memory 120 may be stored in a separate unshown database. Further, devices may be embodied as virtual servers.

Figure 2:
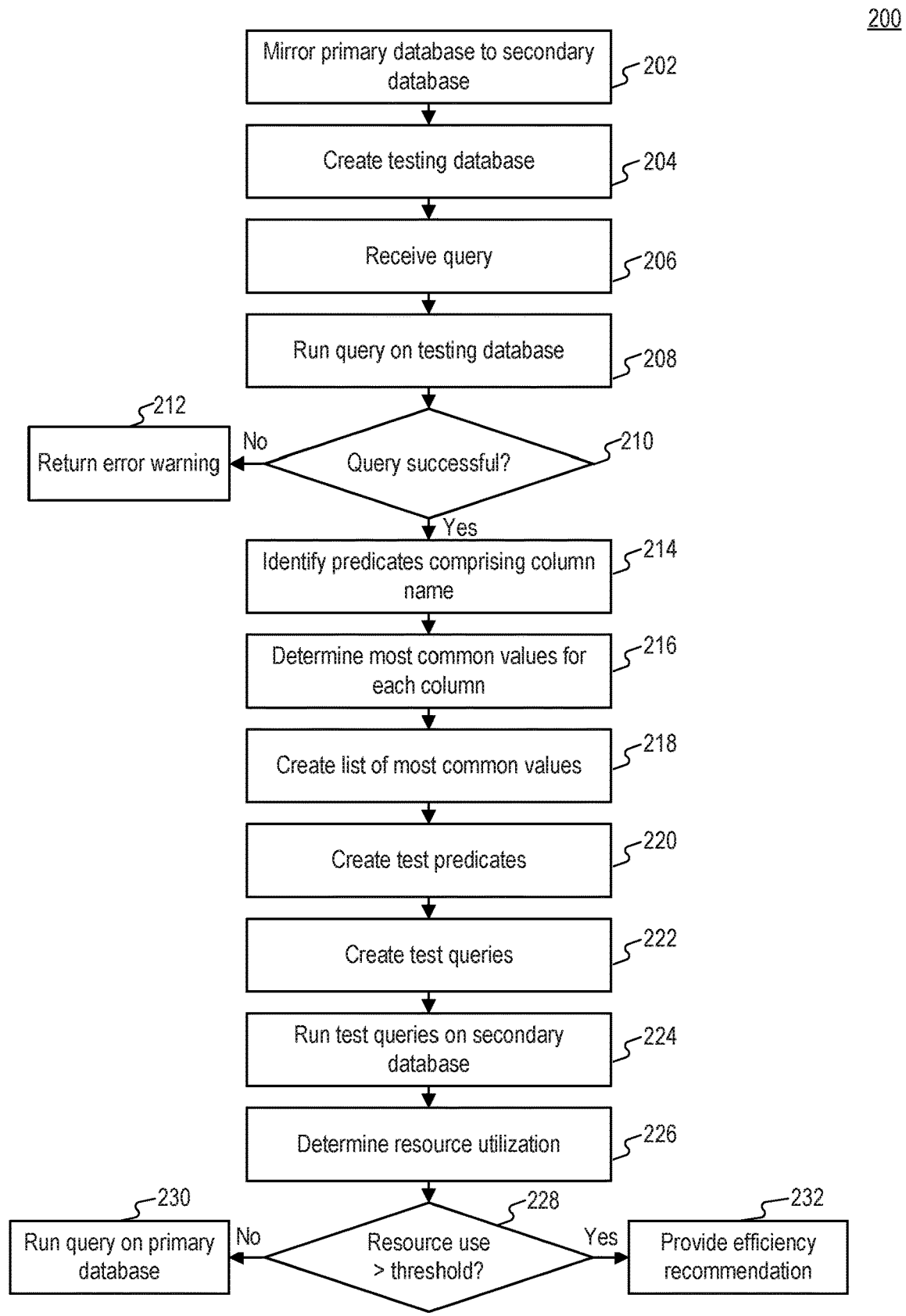
FIG. 2 is a flowchart of a database query efficiency improvement process, consistent with the disclosed embodiments.

FIG. 2 shows a flowchart of a database query efficiency improvement process 200, consistent with the disclosed embodiments. Query test system 114 may perform process 200 using data stored on databases 104-110. Instructions for performing process 200 may be stored on memory 120 and implemented by a processor of query test system 114. Process 200 may include the following steps which will be illustrated by reference to FIG. 3 where appropriate to aid understanding of the steps.

At step 202, query test system 114 mirrors primary database 104 to secondary database 106, the second database comprising a schema. In other words, query test system 114 copies primary database 104 to secondary database 106. The schema, or data structure including information such as column names and data types for each column name, may be the same as the schema of primary database 104. The mirror may be partial, such as a randomly selected subset of data stored on primary database 104. Query test system 114 may execute step 202 at random intervals, for example, whenever primary database 104 has surplus processing power, periodically, or due to an event such as when a developer clicks a button to copy information from a database. When the mirror is initialized, or set up for the first time, query test system 114 may copy the data schema of primary database 104. Subsequent updates may then edit data (e.g. add, modify, or delete data) in secondary database 106 without updating the schema.

At step 204, query test system 114 creates testing database 108 comprising the schema. While data in testing database 108 may comprise the same schema as primary database 104 and secondary database 106, testing database 108 may include synthetic data, or, in other words, artificial "filler" data generated as place holder information. Developers may debug queries by running queries against testing database 108 and ensuring that queries do not fail due to errors, missing columns, and the like. Thus, because testing database 108 may be used to test basic functionality of queries, testing database 108 may not need to contain the same information or quantity of data as primary database 104 or secondary database 106. Alternatively, in some embodiments, testing database 108 may contain the same information as primary database 104 and/or secondary database 106.

At step 206, query test system 114 receives a query, and runs the query on testing database 108 at step 208. Running the query may include submitting the query to a database, wherein the database looks for information matching criteria of the query, and returns data. A developer may submit the query to query test system 114 via client device 122. Query test system 114 may host a web interface allowing developers to draft and submit queries for testing functionality against the same schema used to store data in primary database 104.

At step 210, query test system 114 may determine whether the query successfully completed on testing database 108. When query test system 114 determines that the query has failed by, for instance, detecting the presence or absence of an error message from testing database 108, step 210 is NO, and query test system 114 may proceed to step 212 to return a warning that the query failed. Query test system 114 may provide an error report to help a developer determine the cause of the query test failure. However, when query test system 114 determines that the query has run successfully, step 210 is YES, and query test system 114 may proceed to step 214. Query test system 114 may provide an indication to a developer that the query succeeded and request approval to continue to the next steps of process 200.

At step 214, query test system 114 identifies predicates in the query, each predicate comprising a column name. Predicates may include, for instance, elements of a database query indicating conditions for entries that must be selected. For example, if the query is a SQL query, a predicate may be a condition of the query WHERE statement specifying a value for a database column.

Figure 3:
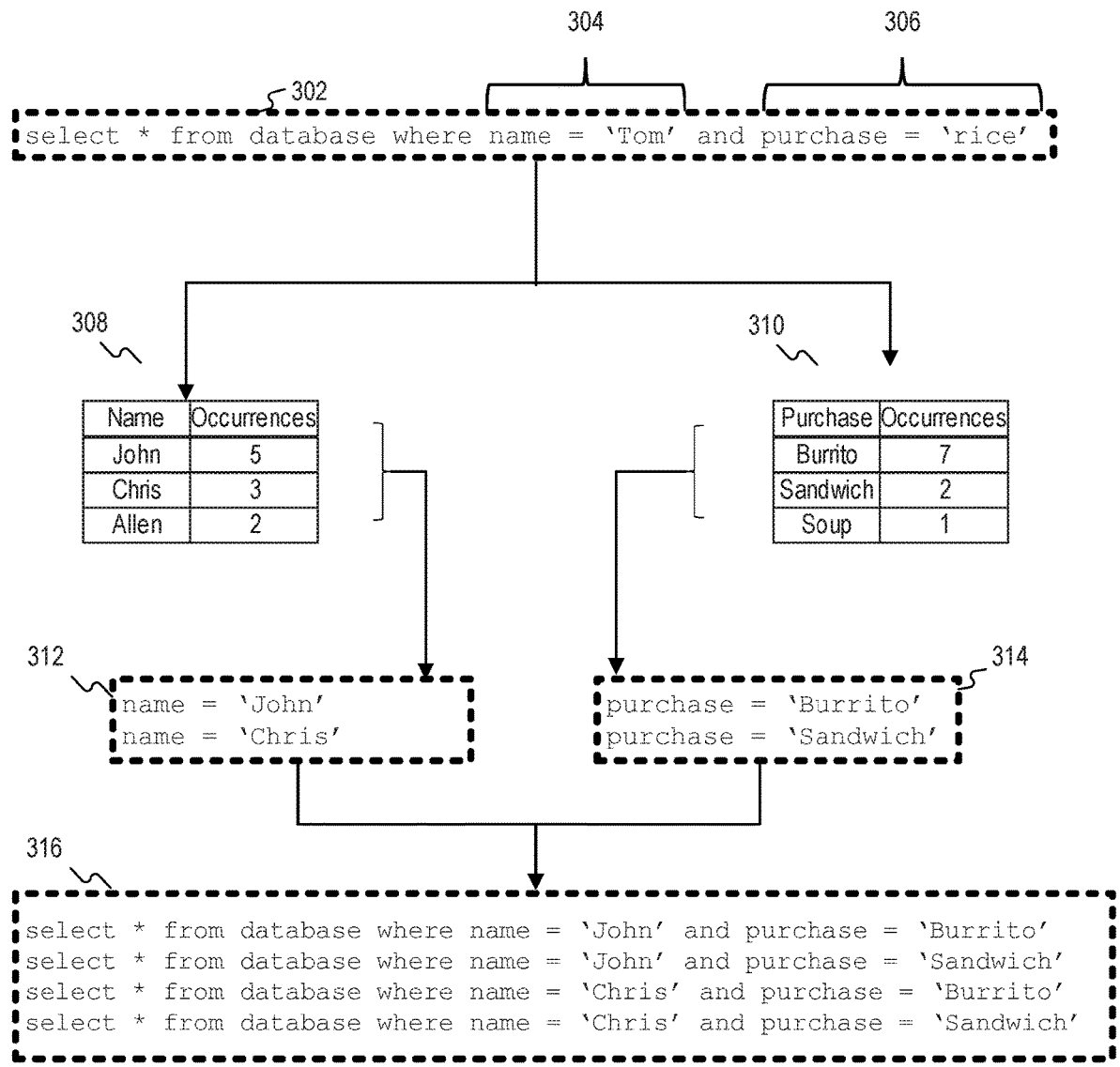
FIG. 3 illustrates creation of query variations, consistent with the disclosed embodiments.

FIG. 3, showing creation of query variations consistent with disclosed embodiments further illustrates the use of step 214. FIG. 3 first shows a received query 302, which may be a SQL query. Received query 302 of FIG. 3 is a test query provided by a developer, and refers to artificial data stored in a test database having the same database schema as a production database. For example, the name "Tom" may appear in the test database as an artificial entry, but not appear in the production database with real data. Received query 302 contains two predicates. First predicate 304 is "name='Tom'", and second predicate 306 is "purchase='rice'". First predicate 304 therefore refers to column "name", and second predicate 306 refers to column "purchase." In this example, because the data in the query is artificial, the values of first predicate 304 and second predicate 306 may be discarded.

To identify predicates, step 214 may comprise running a regular expression script, a method to identify and extract character patterns, against the query text to identify predicates and further identify a column name and value of each predicate. The scripts may include fuzzy matching techniques to identify predicates that vary slightly from the patterns being evaluated by the script. In some embodiments, fuzzy matching predicates (which aid in finding matches containing small variations from a pattern) and mathematical tests (such as comparing numbers) may be omitted. Predicates may also be processed to standardize predicate data, such as by removing punctuation and white space. Further, in some scenarios, a developer may draft a query with multiple predicates comprising the same column name. Query test system 114 may also deduplicate predicates by column name, such that a list of column names derived from the query has no duplicate values. Step 214 may conclude with a set of column names of a query. For example, in FIG. 3, the simple SQL query illustrated as received query 302 would be processed by step 214 to determine column names "name" and "purchase".

Returning to FIG. 2, at step 216, query test system 114 determines most common values for each column name by querying secondary database 106. Query test system 114 may construct a query to aggregate, count, and order entries in a column by number of occurrences. In this way, query test system 114 determines a count of each value in a column corresponding to the column name. This step may be further understood as illustrated in FIG. 3. After identifying column names "name" and "purchase" from received query 302, query test system 114 reviews entries in the column "name" and column "purchase" of an offline database. For example, the offline database may have 10 rows of entries. Out of those ten rows, the "name" column records "John" five times, "Chris" three times, and "Allen" two times, as shown in table 308. Similarly, table 310 is constructed for the "purchase" column for values "burrito", "sandwich", and "soup". The most common values of the tables may be determined as the top two entries, for instance. Thus, "John" and "Chris" are the most common values for table 308, and "Burrito" and "Sandwich" are the most common values for table 310.

To accommodate a changing number of total entries in primary database 104, due to deletion or addition of entries, query test system 114 may find most common values for each column by calculating, for each value, a fraction corresponding to the determined count relative to the total number of entries in the column. Most common values refers to values in the column that appear in the column more frequently. Thus, for example, values that appear in a column more than a predetermined threshold number of times may be most common values for that particular column. For example, a database of clothing items may include a column recording a value for clothing type for each item in the database. If the database has 10 entries for shoes, 50 entries for coats, and 40 entries for shirts, query test system 114 may calculate a value of 0.1 (e.g. 10/100) for shoes, 0.5 for coats, and 0.4 for shirts. Query test system 114 may then order the values based on respective calculated fractions corresponding to the values. Thus, continuing the clothing example, query test system 114 would determine an order of: coats, shirts, shoes. Query test system 114 may then analyze the list and iteratively select unselected values having a highest corresponding fraction until a sum of fractions corresponding to the selected values exceeds a fraction threshold. The threshold may be set by a developer when submitting the query, for instance, or may be preset in the code of query test system 114. In the clothing example, if the threshold were set to be 0.4, query test system 114 would begin with coats, compare the fraction for coats (0.5) with the threshold (0.4), and determine that coats is the only "most common value" for step 216. Alternatively, if the threshold were set to be 0.7 (i.e., indicating that selected queries must make up 70% of all entries), query test system 114 would begin with coats (0.5) and determine that coats make up less than the threshold 0.7 of entries. Query test system 114 would proceed to the next highest entry, i.e., shirts, and determine that coats and shirts together make up 0.9 of all entries (0.5+0.4). Because 0.9 is greater than 0.7, query test system would identify "coats" and "shirts" as the most common values in the database.

At step 218, query test system 114 creates, for each column name, a list comprising at least one of the most common values. The list may include all or a subset of the values identified at step 216. For example, a subset may be identified based on random selection of the values, or the n-most common values, n being an integer. Continuing the coats, shirts, and shoes example, in step 218, query system 114 may make a list including coats and shirts. As an additional example, as stated previously, table 308 of FIG. 3 shows counts for each entry in the "name" column. In this example, query test system 114 is set to select the top two most common values, and creates a list that is "'John', 'Chris'" (Here n=2). Similarly, for example, a list for the "purchase" column would include "'Burrito', 'Sandwich'".

The list may also comprise additional values identified by other means. For example, query test system 114 may access query store 110 comprising historical queries of the primary database and determine most common queried values for each column name. As discussed previously, query store 110 may record historical queries made by client devices 122 of primary database 104 while accessing a website, app, or the like via server 102. Query store 110 may provide query test system 114 with a count showing the number of times each value in a column name appears in a production query. The number of times each value appears in a column name in a production query may be termed queried value. Query test system 114 may also analyze these values to determine which are most commonly queried in a manner similar to that disclosed for determining most common values in step 216.

Query test system 114 may combine the most queried values and the most common values into a list at step 218 for use later to create query variations in subsequent steps. In some embodiments, the list may consist of an intersection of the most common queried values and the most common values. For instance, if the most common values are shoes, shirts, and coats and the most common queried values are pants, shoes, and hats, query test system 114 may create a list at step 218 including shoes, which is the common value between the two sets of values.

In some scenarios, a developer may create a query with a predicate having a mathematical comparison, such as finding all items less than $50. Query test system 114 may identify the most common numerical values for these types of queries. Alternatively or additionally, query test system 114 may identify a most inclusive range for a column name. For example, a query may search for items less than $50.

Query test system 114 may determine the column named "item price" includes items up to $250. Query test system 114 may then use $250 when creating test predicates and queries in subsequent steps.

Returning to FIG. 2, at step 220, query test system 114 creates a test predicate comprising one of the column names and an entry for the list corresponding to the column name. Step 220 may be repeated for each value in the list, and for each column name in the query. If the query received at step 206 contained three predicates with column names price, category, and product name, and each column name had four most common values, query test system 114 may create a total of twelve test predicates. This step is illustrated in FIG. 3. After query test system 114 selects the top two most common values from tables 308 and 310, query test system 114 creates a test predicate for each column name/common value pair. Thus, test predicates 312 include "name='John'" and "name='Chris'" but not "name='Allen'" because "Allen" was not included in the top two most common entries. Similarly, test predicates 314 include "purchase='Burrito'" and "purchase='Sandwich'".

Returning to FIG. 2, query test system 114 then, at step 222, creates a test query comprising one or more test predicates from step 220. The test query may be based on the received query, and query test system 114 may replace the predicates of the received query with predicates of the test query. FIG. 3 illustrates a plurality of test queries 316 that may be created at step 222. Test queries 316 are based on combinations of test predicates 312 and test predicates 314, and the structure of received query 302. Accordingly, while the structure of received query 302 may be retained in test queries 316 (such as the selection and database identification), test queries 316 may replace the predicates having fake values of received query 302 with predicates containing real and most common values. Further, each of test predicates 312 may be combined with each of test predicates 314, resulting in four test queries.

Query test system 114 may also modify the received query to remove or add clauses having a standard or negligible effect on processing time or resource usage and are unaffected by changed predicates, such as instructions to save query results. This may provide quicker comparison of test queries against a common baseline.

At step 224, query test system 114 runs each of the test queries on secondary database 106, and, at step 226, determines a resource utilization of the query. The test queries may be run on secondary database 106 to analyze real-world data without disrupting primary database 104 from providing data to clients. The resource utilization of the query may be a metric representing the cumulative, maximum, or average resource consumption of the test queries. In some embodiments, resource utilization may comprise at least one of rows analyzed, processing time, and memory usage. The determined resource utilization may aid developers in identifying risky queries that have a possibility of consuming excessive resources of primary database 104 if the query is deployed for use by clients. In other words, because the test queries retrieve data for entries using the most common values in the database, the test queries are likely to represent the most resource intensive applications of the received query. Developers may refrain from deploying queries with a significant likelihood of resource intensive application. Additionally, if the test queries contain values derived from query store 110, the test queries will represent the most likely use cases, as informed by real-world client interactions. In this manner, query test system 114 may estimate the worst case scenario resource utilization by querying the most common values, and estimate the most likely resource use by querying the most common queried values. In some embodiments, query test system 114 may also estimate the most likely, worst case scenario resource utilization by querying the intersection of the two value types. This may allow for more targeted, and thus quicker, query efficiency testing, which may be useful for scenarios with a large number of most common values and predicates. Query test system 114 may also calculate a likelihood of a worst case scenario or an expectation value of resource usage based on the historical frequency of queries containing the most common values.

At step 228, query test system 114 determines if resource utilization exceeds a threshold. The threshold may reflect a company policy, such as a policy that a query may not require more than 1 millisecond to complete. The threshold may also be variable and based on the likelihood, such that in 99.999% of scenarios a query must complete in less than 5 milliseconds, or in 99% of scenarios the query must complete in less than 2 milliseconds.

If the resource utilization is less than the threshold, step 228 is NO. Because the risk of impact to a client is sufficiently low, query test system 114 may then proceed to run the query on the primary database at step 230. This may provide an additional test of the query against real-world data. By measuring the resource consumption of the query on primary database 104, query test system may determine that differences between primary database 104 and secondary database 106, such as security settings or conflicts from many concurrent queries, lead to unacceptable impacts to client experiences. In this way, developers can gradually test query resource consumption, first to test basic functionality, then to test worst case scenarios, and lastly to test real-world performance, with safeguards to identify high risk queries and prevent them from entering environments where harm may occur. Further, in some embodiments, query system 114 may allow the received query to be loaded onto sever 102 and enter production based on a determination that a resource utilization associated with the query is low (e.g. less than a threshold resource utilization).

Alternatively, if resource usage is greater than the threshold, step 228 is YES, and query test system 114 proceeds to step 232 to provide, to a user interface for display, an efficiency improvement recommendation. Query test system 114 may calculate an efficiency improvement recommendation based on heuristics provided by developers. For example, developers may provide query test system 114 with suggestions for improving query performance, the suggestions corresponding to resource utilization ranges such that changes that are difficult to implement are provided for very inefficient queries, and minor changes are provided for queries with minor inefficiencies. Heuristics may include methods observed by developers to increase query efficiency, such as avoiding nested queries. As an additional example, query test system 114 may analyze a database to determine if a section of the database has been sorted such that query results are found in a certain section of the database. For example, the database may be alphabetized by item name. Query test system 114 may then determine that items beginning with the letter "s" start at row 1787 of the database, and provide an efficiency recommendation that comprises adding an index to the query such that the query begins searching at row 1787.

In some embodiments, query test system 114 may automatically create a query comprising the recommendation so that a developer may compare the original performance to the modified query performance. In this case, resource utilization may be a first resource utilization, and evaluating the query may include additional steps. Query test system 114 may modify the query based on the efficiency recommendation, for instance, by adding an index. Query test system 114 may then run the modified query. In some embodiments, this may include repeating steps 222 through 226 on the basis of the modified query. Query test system 114 may determine a second resource utilization of the modified query, and provide, to the user interface for display, a resource utilization difference between the first and the second resource utilization. Query test system 114 may also run the modified query on primary database 104.

Process 200 may be further understood by the illustrations presented in FIG. 3 showing the creation of query variations, consistent with disclosed embodiments. FIG. 3 provides an example of some of the data progression between steps 206 and 222 of process 200.

As an exemplary embodiment of the present disclosure, a computer-implemented method for database query efficiency improvement includes mirroring a primary database to a secondary database, the second database comprising a schema; creating a testing database comprising the schema; receiving a query; and running the query on the testing database. The method further evaluates the query if the query successfully completes on the testing database by identifying predicates in the query, each predicate comprising a unique column name; determining most common values for each column name by querying the secondary database; determining most common queried values for each column name by querying a query store; and creating, for each column name, a list comprising at least one of the most common values and at least one of the most common queried values. The method further analyzes the query by creating test predicates comprising one of the column names and an entry for the list corresponding to the column name; creating test queries comprising combinations of test predicates; determining query processing times by running each of the test queries on the secondary database; and running the query on the primary database when a maximum of the query processing times is less than a threshold.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A computer-implemented system for database query efficiency improvement, the system comprising:
a memory storing instructions; and
at least one processor configured to execute the instructions to perform operations comprising:
identifying predicates in a query, each predicate comprising a column name;
determining most common values for each column name by counting entries in a column by a number of occurrences;
creating, for each column name, a list comprising at least one of the most common values;
creating one or more test predicates, each test predicate comprising one of the column names and an entry for the list corresponding to the column name;
creating a test query comprising at least one test predicate of the one or more test predicates;
running the test query;
determining a first resource utilization of the test query by tracking a memory usage associated with running the test query;
determining whether the first resource utilization of the test query exceeds a threshold based on the tracked memory usage;
based on determining that the first resource utilization exceeds the threshold, providing, to a user interface for display, a recommendation;
modifying the test query based on the recommendation;
determining a second resource utilization of the modified test query; and
providing, to the user interface for display, a resource utilization difference between the first and the second resource utilizations.

2. The system of claim 1, wherein the list further comprises most common queried values for each column name determined by querying a query store comprising historical queries of the primary database.

3. The system of claim 2, wherein the list consists of an intersection of the most common queried values and the most common values.

4. The system of claim 2, wherein the list comprises n-most common values.

5. The system of claim 1, wherein the recommendation comprises adding an index to the query.

6. The system of claim 1, wherein determining most common values for each column name comprises:
- determining a count of each value in a column corresponding to the column name;
- calculating, for each value, a fraction corresponding to the determined count relative to a total number of entries;
- ordering the values based on respective calculated fractions corresponding to the values; and
- iteratively selecting unselected values, each of the unselected values having a highest corresponding fraction until a sum of fractions corresponding to the selected values exceeds the threshold.

7. The system of claim 1, wherein the operations further comprise running the query on a primary database when the first resource utilization is less than the threshold.

8. The system of claim 1, wherein the first resource utilization comprises at least one of rows analyzed, processing time, and the memory usage.

9. The system of claim 1, wherein the operations further comprise deduplicating predicates by column name.

10. A computer-implemented method for database query efficiency improvement comprising:
- identifying predicates in a query, each predicate comprising a column name;
- determining most common values for each column name by counting entries in a column by a number of occurrences;
- creating, for each column name, a list comprising at least one of the most common values;
- creating one or more test predicates, each test predicate comprising one of the column names and an entry for the list corresponding to the column name;
- creating a test query comprising at least one test predicate of the one or more test predicates;
- running the test query;
- determining a first resource utilization of the test query by tracking a memory usage associated with running the test query;
- determining whether the first resource utilization of the test query exceeds a threshold based on the tracked memory usage;
- based on determining that the first resource utilization exceeds the threshold, providing, to a user interface for display, a recommendation;
- modifying the test query based on the recommendation;
- determining a second resource utilization of the modified test query; and
- providing, to the user interface for display, a resource utilization difference between the first and the second resource utilizations.

11. The method of claim 10, wherein the list further comprises most common queried values for each column name determined by querying a query store comprising historical queries of the primary database.

12. The method of claim 11, wherein the list consists of an intersection of the most common queried values and the most common values.

13. The method of claim 11, wherein the list comprises n-most common values.

14. The method of claim 10, wherein the recommendation comprises adding an index to the query.

15. The method of claim 10, wherein determining most common values for each column name comprises:
- determining a count of each value in a column corresponding to the column name;
- calculating, for each value, a fraction corresponding to the determined count relative to a total number of entries;
- ordering the values based on respective calculated fractions corresponding to the values; and
- iteratively selecting unselected values, each of the unselected values having a highest corresponding fraction until a sum of fractions corresponding to the selected values exceeds the threshold.

16. The method of claim 10, wherein the operations further comprise running the query on a primary database when the first resource utilization is less than the threshold.

17. The method of claim 10, wherein the first resource utilization comprises at least one of rows analyzed, processing time, and the memory usage.

18. The system of claim 10, wherein the operations further comprise deduplicating predicates by column name.

\* \* \* \* \*